(12) United States Patent
Park et al.

(10) Patent No.: US 8,820,624 B2
(45) Date of Patent: Sep. 2, 2014

(54) COOKING INFORMATION BOOK, COOKING SYSTEM, COOKING METHOD, AND USING METHOD FOR THE COOKING SYSTEM

(75) Inventors: Won Kyoung Park, Changwon (KR); Soo Cheol Yi, Changwon (KR); Jung Ho Bae, Changwon (KR)

(73) Assignee: LG Electronics Inc., Seoul (KR)

( * ) Notice: Subject to any disclaimer, the term of this patent is extended or adjusted under 35 U.S.C. 154(b) by 871 days.

(21) Appl. No.: 12/522,846

(22) PCT Filed: Nov. 15, 2007

(86) PCT No.: PCT/KR2007/005753
§ 371 (c)(1),
(2), (4) Date: Jan. 28, 2010

(87) PCT Pub. No.: WO2008/084916
PCT Pub. Date: Jul. 17, 2008

(65) Prior Publication Data
US 2010/0127066 A1    May 27, 2010

(30) Foreign Application Priority Data

Jan. 11, 2007  (KR) .................. 10-2007-0003294
Jan. 17, 2007  (KR) .................. 10-2007-0005314
Jan. 17, 2007  (KR) .................. 10-2007-0005325
Jan. 25, 2007  (KR) .................. 10-2007-0007803

(51) Int. Cl.
G06F 17/00    (2006.01)
G06K 19/06    (2006.01)
H04Q 5/22     (2006.01)
G08B 13/14    (2006.01)
G06Q 10/00    (2012.01)
G06Q 50/00    (2012.01)

(52) U.S. Cl.
CPC ................ *G06Q 10/00* (2013.01); *G06Q 50/00* (2013.01)
USPC ........................... 235/375; 235/492; 340/10.1

(58) Field of Classification Search
USPC ............ 235/375, 492; 340/10.1, 572.1–572.8
See application file for complete search history.

(56) References Cited

U.S. PATENT DOCUMENTS 4,780,588 A * 10/1988 Edamura ....................... 219/714
5,254,823 A   10/1993 McKee et al.
5,426,280 A * 6/1995 Smith ........................... 219/506
6,137,095 A * 10/2000 Kashimoto et al. ........... 219/702
7,096,221 B2  8/2006 Nakano
(Continued)

FOREIGN PATENT DOCUMENTS

CN    1700236 A    11/2005
EP    1174667 A1    1/2002
(Continued)

*Primary Examiner* — Michael G Lee
*Assistant Examiner* — Laura Gudorf
(74) *Attorney, Agent, or Firm* — Birch, Stewart, Kolasch & Birch, LLP

(57) ABSTRACT

A cooking system is provided. The cooking system includes: a radio frequency tag; a cooking appliance provided with a radio frequency reader to receive food related data from the radio frequency tag, the cooking appliance comprising at least a heating element; and a server receiving at least the food related data from the cooking appliance, the server transmitting food cooking data for cooking a food suitable for the cooking appliance using the food related data, wherein the cooking appliance operates using the food cooking data.

14 Claims, 7 Drawing Sheets

(56) References Cited

U.S. PATENT DOCUMENTS

| | | | |
|---|---|---|---|
| 2002/0059175 A1* | 5/2002 | Nakano | 707/1 |
| 2002/0121514 A1 | 9/2002 | Ishikawa | |
| 2002/0157411 A1 | 10/2002 | Ishikawa et al. | |
| 2002/0169666 A1* | 11/2002 | Ike et al. | 705/14 |
| 2003/0139843 A1* | 7/2003 | Hu et al. | 700/211 |
| 2004/0149736 A1* | 8/2004 | Clothier | 219/627 |
| 2005/0140794 A1* | 6/2005 | Yahagi | 348/211.2 |
| 2006/0280007 A1* | 12/2006 | Ito et al. | 365/192 |
| 2007/0029306 A1 | 2/2007 | Chun et al. | |
| 2008/0282182 A1* | 11/2008 | Oosaka | 715/772 |

FOREIGN PATENT DOCUMENTS

| | | |
|---|---|---|
| EP | 1726899 A1 | 11/2006 |
| JP | 09-287743 A | 11/1997 |
| JP | 2001-317741 A | 11/2001 |
| JP | 2002-022176 A | 1/2002 |
| JP | 2002-512009 A | 4/2002 |
| JP | 2002-196672 A | 7/2002 |
| JP | 2004-138331 A | 5/2004 |
| JP | 2005-228146 A | 8/2005 |
| JP | 2005-257217 A | 9/2005 |
| KR | 10-2003-0063082 A | 7/2003 |
| KR | 10-2004-0047630 A | 6/2004 |
| KR | 10-2005-0008256 A | 1/2005 |
| KR | 10-2005-0028097 A | 3/2005 |
| KR | 10-2005-0031802 A | 4/2005 |
| KR | 10-2005-0080409 A | 8/2005 |
| KR | 20-0393043 Y1 | 8/2005 |
| KR | 20-0429897 Y1 | 11/2006 |
| KR | 10-2007-0010899 A | 1/2007 |
| RU | 2122772 C1 | 11/1998 |
| RU | 2141746 C1 | 11/1999 |

* cited by examiner

Fig. 1
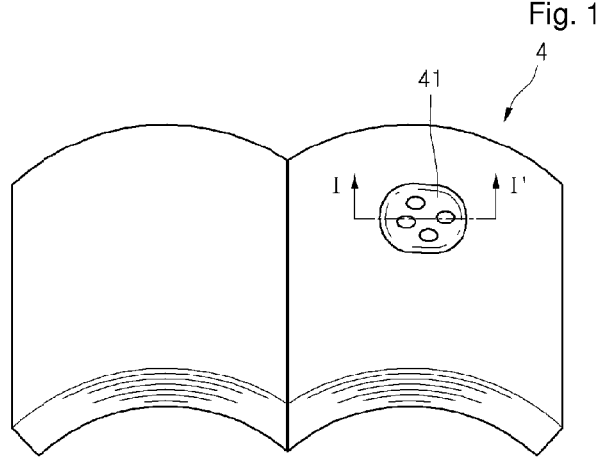
Fig. 2
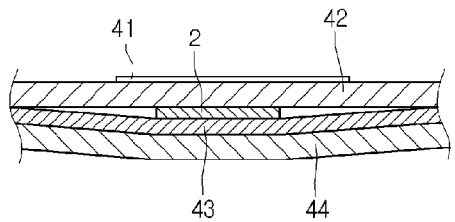
Fig. 3
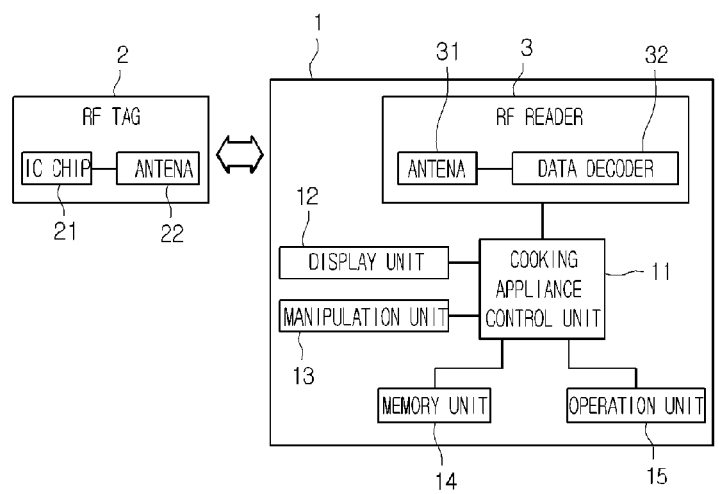
Fig. 4
| ADDRESS | FIELD NAME |
|---|---|
| 0 | START CODE |
| 1 | AUTHENTICATION CODE |
| 2 | FOOD COOKING METHOD CODE |
| 3 | IMAGE DATA |
| 4 | ADDITIONAL DATA OF FOOD |
| 5 | ERROR CODE |
| 6 | END CODE |

| ADDRESS | FIELD NAME |
|---|---|
| 0 | START CODE |
| 1 | AUTHENTICATION CODE |
| 2 | LAYER DATA OF FOOD |
| 3 | NETWORK ADDRESS DATA |
| 4 | ID OF FOOD |
| 5 | ERROR CODE |
| 6 | END CODE |

COOKING INFORMATION BOOK, COOKING SYSTEM, COOKING METHOD, AND USING METHOD FOR THE COOKING SYSTEM

TECHNICAL FIELD

The present disclosure relates to a cooking information book, a cooking system, a cooking method, and a method for using the cooking system, and more particularly, to a cooking system, that allows a user to conveniently cook foods and a method for using the cooking system.

BACKGROUND ART

A user usually cooks food based on experience. Alternatively, a user may learn a recipe from books to cook foods.

However, since the user obtains food information from limited resources, the obtained food information may not include specific information, such as preference for a food, conditions of a cooked food, or a specific example of cooking a food, due to space limitation of books. Therefore, in cooking with reference to books, a user may cook by guess because of insufficient information of the book.

A user may obtain food information through the Internet. However, a user may feel inconvenience because they should go to, e.g., a library far from the kitchen to learn a recipe through the Internet. In addition, it is difficult to manipulate a complex cooking appliance according to data provided on the Internet.

As a result, there is a limitation that the food is not cooked optimally.

The cooking appliance necessarily includes a heating element. The food is cooked using heat from the heating element. However, in case where the amount of heat from the heating element is insufficient or the performance of the heating element is poor due to physical deterioration, replacement of only the heating element is almost impossible. Therefore, an entire cooking appliance must be replaced, which costs much.

DISCLOSURE OF INVENTION

Technical Problem

Embodiments provide a cooking information book, a cooking system, a cooking method, and a method for using the cooking system that can easily cook foods by a user, accurately use information through the other information media even if the user is ignorant of a manipulation method of a cooking appliance, obtain properly cooked food, and freely replace components used within the cooking system to increase the useful life of the cooking appliance.

Technical Solution

In one embodiment, a cooking system includes: a radio frequency tag; a cooking appliance provided with a radio frequency reader to receive food related data from the radio frequency tag, the cooking appliance including at least a heating element; and a server receiving at least the food related data from the cooking appliance, the server transmitting food cooking data for cooking a food suitable for the cooking appliance using the food related data, wherein the cooking appliance operates using the food cooking data.

In another embodiment, a cooking information book includes: a first sheet medium; a food design portion on a surface of the first sheet medium; a radio frequency tag on a lower surface of a position corresponding to the food design portion; and a conductor facing a bottom surface of the radio frequency tag, the conductor interfering high frequency communication with the radio frequency tag.

In still another embodiment, a cooking method includes: transmitting food data from a radio frequency tag to a cooking appliance; storing the food data transmitted from the radio frequency tag; and operating the cooking appliance with reference to the food data.

In even another embodiment, a cooking system includes: a radio frequency tag aggregate including at least two radio frequency tags, each of the radio frequency tags storing cooking data of a food; a radio frequency reader reading food data stored in the radio frequency tag; and a display unit displaying the food data.

In yet another embodiment, a cooking system includes: a radio frequency tag; and a cooking appliance including at least a radio frequency reader to receive food related data from the radio frequency tag, wherein the food related data including at least control data of the cooking appliance, and the cooking appliance includes: a memory storing the control data of the cooking appliance; a display unit displaying the control data; and a manipulation unit modifying the control data displayed on the display unit.

In further another embodiment, a cooking method includes: inputting cooking data of a food to a cooking appliance; transmitting the cooking data of the food to a server; and generating cooking control data with reference to the cooking data of the food, and operating the cooking appliance using the cooking control data under a control of the server to perform cooking of the food.

In still further another embodiment, a cooking system includes: a case; and a replaceable heater inside the case, wherein, when the heater is replaced, control data controlling the replaced heater is received to properly control the heater.

In even further another embodiment, a method of using a cooking system includes: replacing components of the cooking system; and receiving control data of the replaced components, storing the control data, and using the control data as control data of the cooking system.

Advantageous Effects

According to the present disclosure, much more data can be obtained through a cooking information book and effectively utilize a cooking method using a cooking appliance even if the user is ignorant of data provided by the cooking information book. A person who is ignorant of catering for materials of a food easily caters materials of the food using an image data before cooking the food. A user can obtain the latest data related to the food in real-time, and much more data can be provided by varying usefulness of the cooking information book to improve satisfaction of a book purchaser. The optimum data can be transmitted to cook the food in a state required by the user, and the cooking appliance can operate in an optimum condition even if the cooking appliance is deteriorated. The user can accurately cook the food into user's desired directions. Components of the cooking system can be easily replaced according to the user's preference, and data of a new cooking system can be always obtained to improve convenience of the user.

BRIEF DESCRIPTION OF THE DRAWINGS

FIG. 1 is a perspective view of a cooking information book according to a first embodiment.

FIG. 2 is a cross-sectional view taken along line I-I' of FIG. 1.

FIG. 3 is a block diagram of a cooking system according to the first embodiment.

FIG. 4 is a table illustrating contents of data stored in an RF tag where the data is transferred to a cooking appliance.

BEST MODE FOR CARRYING OUT THE INVENTION

Figure 5:
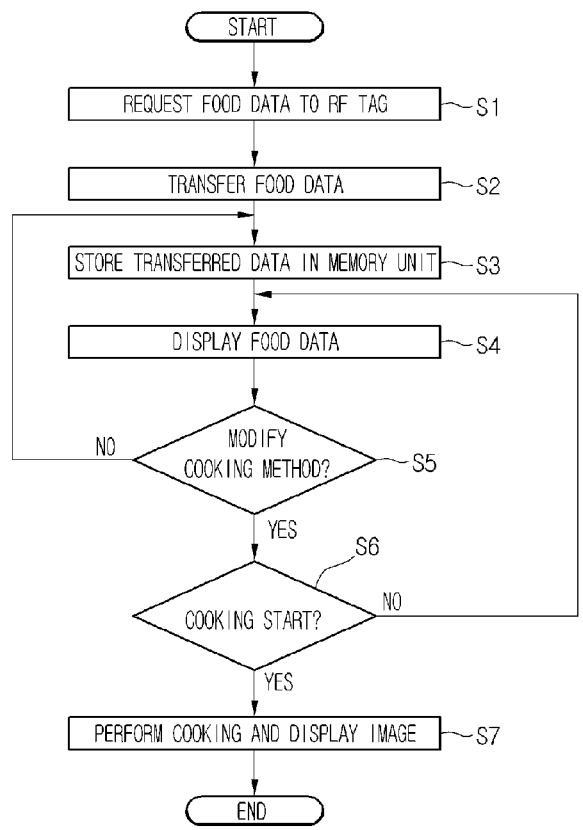
FIG. 5 is a flowchart of a cooking method according to the first embodiment.

Reference will now be made in detail to the embodiments of the present disclosure, examples of which are illustrated in the accompanying drawings.

<First Embodiment>

A cooking system according to embodiments of the present disclosure is configured by an RF tag reading system including an RF tag and an RF reader. In an operation of the RF tag reading system, when a reader requests a tag to transmit tag data, the tag transmits tag data as a radio frequency (RF) to the reader. In this embodiment, the RF tag is provided to a cooking information book, and the RF reader is provided to a cooking appliance.

FIG. 1 is a perspective view of a cooking information book according to a first embodiment, and FIG. 2 is a cross-sectional view taken along line I-I' of FIG. 1.

Referring to FIGS. 1 and 2, an image of specific food is illustrated in a food design portion 41 included in each page of a cooking information book 4. Therefore, a user can see an image of a desired food through the food design portion 41. An RF tag 2 is built in a portion of a page that the food design portion 41 is disposed.

A page of the cooking information book 4, particularly the food design portion 41, includes a first paper 42, the RF tag 2, a conductor 43, and a second paper 44. The first paper 42 and the second paper 44 form an upper surface and a lower surface of each page, respectively. Proper data of a food is recorded in the RF tag 2. The conductor 43 shields the lower surface of the RF tag 2 to prevent high frequency generated in the RF tag 2 from being transmitted to the lower surface of the page.

In an operation of the cooking information book 4, since a provision disposition of the RF tag 2 is aligned with the food design portion 41, a user can read the food data recorded in the RF tag 2 by bringing a cooking appliance 1 close to the image of foods.

The cooking information book 4 includes a plurality of sheets of paper. Therefore, when an RF reader is brought close to the RF tag 2, food data may be read from an RF tag built in a previous or next page. The conductor 43 is mounted under the RF tag 2 included in each page so as to read only data of the RF tag 2 included in a page appointed by a user. The RF tag 2 built in any one page radiates high frequency in only an upward direction because of the conductor 43. The RF tag 2 built in a next page of the page desired by a user is shielded from the conductor 43 of the current page.

A user can always read proper data of an image of a desired food included in a desired page by means of the configuration of the cooking information book 4.

FIG. 3 is a block diagram of a cooking system according to the first embodiment.

Referring to FIG. 3, a cooking system includes an RF tag 2 and a cooking appliance 1. Proper data of a specific food is recorded in the RF tag 2. The cooking appliance includes an RF reader system for reading the food data recorded in the RF tag 2.

The RF tag 2 includes an IC chip 21 and an antenna 22. At least food related data is recorded in the IC chip 21. The antenna 22 radiates the data recorded in the IC chip 21 as high frequency. Energy may be received from the terminal through the antenna 22. The RF reader 3 includes an antenna 31 that exchanges high frequency signal with the RF tag 2 and a data reading unit 32 that processes data received through the antenna 31.

The cooking appliance 1 includes a cooking appliance control unit 11 controlling an entire system of a terminal, a display unit 12 displaying a state and the other data, a manipulation unit 13 manipulating an operation state of the cooking appliance 1 by a user, a memory unit 14 storing a plurality of data necessary for driving the cooking appliance 1, and an operation unit 15, e.g., a heat source, performing an original operation of the cooking appliance 1.

An operation of the cooking appliance will be described below.

A cooking information book 4 approaches the cooking appliance 1 by a user. Then, cooking data recorded in the RF tag 2 is transmitted to the cooking appliance 1 through the antenna 22. Here, since the RF tag 2 is aligned with the food design portion 41, a user can easily read the desired food data.

The data recorded in the RF tag 2 and transmitted to the cooking appliance 1 is illustrated in FIG. 4.

Referring to FIG. 4, a start code includes a code representing start of data and an end code includes a code representing end of data. An authentication code includes an authentication code of the cooking appliance 1 reading data and a code used for authentication of the RF tag 2. An error code includes a code for detecting generation of error during transmission of data. Each of fields includes a code fundamentally necessary for an operation of an RF tag reading system and may be changed depending on specific states.

In addition to such data, cooking data for cooking foods, image data for identifying foods, and additional data related to the foods are further stored in the RF tag.

In detail, the cooking data stored in an address "2" stores an operation data of the cooking appliance necessary for cooking a predetermined food illustrated in the food design 41 of FIG. 1. For example, a specific driving method of the cooking appliance such as specific data in which the food is heated at about 300° C. for about 10 minute and then further heated at about 100° C. for about 10 minute may be stored in the address "2."

The image data stored in an address "3" stores a cooking process of the food as image data. A cooking condition of the cooked food after a predetermined time is passed is visually observed. Based on the image data, the user can observe the cooking process through the display unit 12 of FIG. 3, thereby enhancing user's satisfaction. Also, the user can determine whether the imaginary cooking process is synchronized with an actual cooking process or not. If the actual cooking process is differs from the imaginary cooking process, the user recognizes occurrence of an error and may end the actual cooking process to newly perform the cooking process.

The additional data stored in an address "4" stores various data, which is not written in the cooking information book due to a lack of paper. For example, a user's preference with respect to a corresponding food or the precautions to be taken while the user prepares foods before heating the foods may be stored.

Again referring to FIG. 3, data transmitted to the cooking appliance 1 is decoded by the data decoder 32, and the decoded data is stored in the memory unit 14. The data stored in the memory unit 14 is displayed through the display unit 12. In addition, the data may be outputted as sound from a speaker (not shown).

The user may modify the cooking method using the image data displayed on the display unit 12 and obtain various additional data.

After the user performs various manipulations such as the modification of the cooking method, the cooking appliance manipulated in an execution mode to perform a cooking of the food using the cooking method received from the RF tag 2. When the cooking of the food is performed, the user can compare the image data received from the RF tag 2 with a condition of the actually cooked food to detect whether the food is being well cooked or not.

The user can easily obtain various data related to foods. In case where sufficient data is not provided in the cooking information book due to a lack of paper, much more data can be provided by varying usefulness of the cooking information book.

When the cooking of the food is directly performed, the user can compare accuracy of the condition of the currently cooked food with reference to the image data of the food.

Hereinafter, the cooking method according to the first embodiment will be described in detail with reference to a flowchart.

FIG. 5 is a flowchart of a cooking method according to the first embodiment.

Referring to FIG. 5, a user brings a cooking appliance 1 close to a specific position of a cooking information book built in an RF tag 2 in order to obtain additional data on a food. Then, in operation S1, the cooking appliance 1 requests the RF tag 2 to transmit data recorded in the RF tag 2. Here, if the RF tag 2 manually operates, energy may be applied thereto.

In operation S2, the RF tag 2 transmits the data to the cooking appliance 1 in response to the transmission request. The RF tag 2 may transmit data only after authentication for the cooking appliance 1.

In operation S3, in the cooking appliance 1, the food data is received from the RF tag 2 and then the received food data is stored in a memory unit. In operation S4, at least portion of the food data stored in the memory unit is displayed on a display unit. The displayed data of the food data is data of a cooking method where the cooking appliance directly operates and additional data that can be obtained when the user directly cooks the food. As described above, the additional data includes a user's preference with respect to a corresponding food and the precautions to be taken while the user prepares foods before heating the foods.

In operation S5, the user can modify the displayed cooking method to a cooking method selected by the user. For example, a person who likes their meat well done may modify a cooking method in which the meat is heated at about 300° C. for about 10 minute and then further heated at about 200° C. for about 10 minute to a cooking method in which the meat is heated at about 300° C. for about 15 minute and then further heated at about 200° C. for about 5 minute.

When the cooking method is modified by the user, the modified data is stored in the memory unit in operation S3 and displayed in operation S4. Hence, the modified data may be used as a new cooking method of the food.

If the current cooking method satisfies the user, the user determines whether the cooking starts or not in operation S6. If the cooking starts, the cooking proceeds in operation S7.

When the cooking proceeds in operation S7, image data received from the RF tag 2 is displayed in operation S7. The user can detect whether the food is being well cooked or not using the displayed image. When the image is continuously displayed during a predetermined period of time, the user can detect whether the food is being well cooked at any time during the cooking of the food.

This embodiment may further include the following modified examples.

For example, whenever the cooking method according to the first embodiment is performed, the user may end an additional process, regardless of the current cooking condition. This may be used in case where the user temporarily stops the cooking.

The image data received from the RF tag may be displayed before the cooking of the food to determine whether the food is continuously cooked or not. A method of processing a raw food in the previously provided image data is displayed to easily trim the raw food.

Although the moving picture data is provided in the above-described embodiment, the present disclosure is not limited thereto. Considering the low capacity of the RF tag, the image data may be discontinuously displayed during a predetermined period of time.

<Second Embodiment>

In the first embodiment, data related to the cooking can be obtained within a range of data capable of being stored in the RF tag. However, there is a limitation that the user's usability is limited due to the limited range. In the second embodiment, this limitation is improved to provide a cooking system and a cooking method where the user's usability is maximized. Portions without specific description will cite the description of the first embodiment, and detailed description thereof will be omitted.

Figures 6, 7:
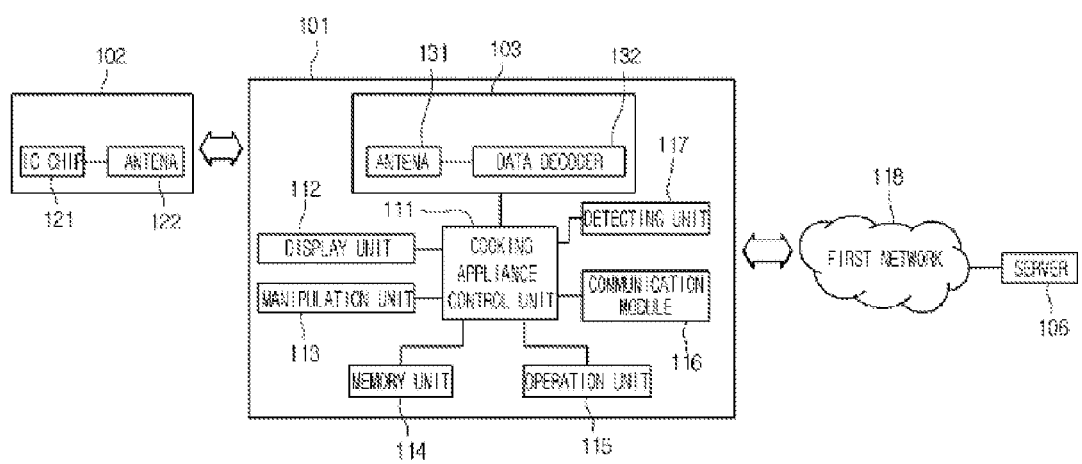
FIG. 6 is a block diagram of a cooking system according to a second embodiment.
FIG. 7 is a table illustrating contents of data stored in an RF tag.

FIG. 6 is a block diagram of a cooking system according to a second embodiment.

Referring to FIG. 6, a cooking system includes an RF tag 102, a cooking appliance 101, a server 106, and a network 118. Proper data related to a specific food is recorded in the first RF tag 102. An RF reader system is built in the cooking appliance 101 to read the food data. The server 106 receives the food data from the cooking appliance 101 and generates reply data. The network 118 connects the server 106 to the cooking appliance 101.

In detail, the RF tag 102 may be provided in a cooking information book including a plurality of sheets of paper. A description of the cooking information book is described in the first embodiment, and thus specific description will be omitted.

The RF tag 101 includes an IC chip 121 where at least food data is recorded and an antenna 122 that allows the data recorded in the IC chip 121 to be radiated as high frequency. Of course, energy may be applied from an RF reader 103 through the antenna 122.

The RF reader 103 includes an antenna 131 for communicating high frequency between the RF tags 101 and a data reading unit 132 for processing data received through the antenna 131.

The cooking appliance 101 includes a cooking appliance control unit 111 controlling an entire system of the cooking appliance 101, a display unit 112 displaying a state and the other data, a communication unit 116 communicating with outside, a manipulation unit 113 manipulating an operation state of the cooking appliance 101 by a user, a memory unit 114 storing a plurality of data necessary for driving the cooking appliance 101, an operation unit 15, e.g., a heat source, performing an original operation of the cooking appliance 101, and a detecting unit 117 detecting the operation state inside the cooking appliance 101.

In detail, the communication unit 116 is connected to a server 106 via a network 118 to exchange data. The memory unit 114 stores an operation data where the cooking appliance 111 controls the operation unit 115. The detecting unit 117 includes a sensor detecting temperature, smoke, and humidity during a cooking operation to transmit the detected data to the cooking appliance control unit 111.

An operation of the cooking system will be described below.

A user brings a cooking information book to a cooking appliance 101.

Proper data related to foods is transmitted to the cooking appliance 101 through the antenna 122. Here, since the first RF tag 102 is aligned with the food design portion of the cooking information book, a user can easily read the desired food data.

The data included in the second RF tag 102 is illustrated in FIG. 7.

Referring to FIG. 7, a start code, an exit code, an authentication code, and an error code are stored in a RF tag as described in the first embodiment.

Besides the above-mentioned data, the RF tag of the food data provision system includes layer data of food, address data on a network where the server 106 is located, and an ID of food in respective address.

In detail, the layer data of food is configured into a plurality of layers that have a subordinate menu. For example, when the food is Western food, the layer is represented as [0002], when the Western food is a pizza, the layer is represented as [0001], when the Pizza is a pan pizza, the layer is represented as [0002], and when the pan pizza is a vegetable pizza, the layer is represented as [0001]. As a result, the layer data includes data having layers [0002/0001/0002/0001]. The address data on a network where the server 106 is located may be an IP address. The server 106 is a server of a book company that provides the cooking information book and may provide an additional service to a purchaser of the cooking information book. Here, the network 118 represents both of wired/wireless networks and may be an Internet network in the case of the wired network. The network 118 may be connected to a server installed in a home as address data of a home network. Address data of the wireless network may refer to a wireless Internet when the terminal is a terminal such as a cellular phone and the like.

The ID of food may be represented as a name such as [a vegetable pizza of a pan size] that directly represents a name of the food and combination of numbers such as [12345678] as a shortened number that allows the name to be easily recognized by the server and combination of other codes.

Again referring to FIG. 1, data transmitted to the cooking appliance 101 is read by the data reading unit 132 and then is transmitted to the outside by the communication module 116. In detail, the data is controlled by the control unit 111 of the cooking appliance 101 and is transmitted to the server 106 through the network 118. The user may additionally input desired data through the manipulation unit 113. Specification data of the cooking appliance 101 as well as the data received from the RF tag 102 may be further added in the data transmitted from the cooking appliance 101 to the server 106. A condition, a position, and operation data of the heater, which is operatable in the cooking appliance, may be included in the specification data of the cooking appliance 101.

The data transmitted to the server 106 is recognized as a specific food by various methods and then data related to the specific food is collected. The collected data is transmitted to the cooking appliance 101 through the network 118, and the transmitted data is displayed on the display 112. Although not shown, the transmitted data may be output as sound data through a speaker.

When the food data is output through the display 112, a user may obtain additional data of the corresponding food with reference to the output data. For example, a user may obtain data on other food related to the corresponding food, a cooking method proper to an oven in the case of an oven of a specific type, and data on a moving picture about cooking, or data on preferences of other people about the specific food.

As described above, a user can read food data in real-time, and thus can obtain recent food data more exactly and can diversify the range of food data to easily obtain various food data. In addition, when sufficient data cannot be provided due to space limitation, more data can be provided by diversifying the range of use for a book.

An operation data of the cooking appliance 101 may be provided in food related data received from the server 106 to the cooking appliance 101. That is, referring to the specification data in addition to the food related data received from the RF tag 102, optimum operation data adapted for operating the cooking appliance 101 may be received. The optimum operation data received from the server 106 may be used for operating the cooking appliance 101 in a state that the memory unit 114 is stored.

Hereinafter, a cooking method according to the second embodiment will be described in detail with reference to a flowchart.

Figure 8:
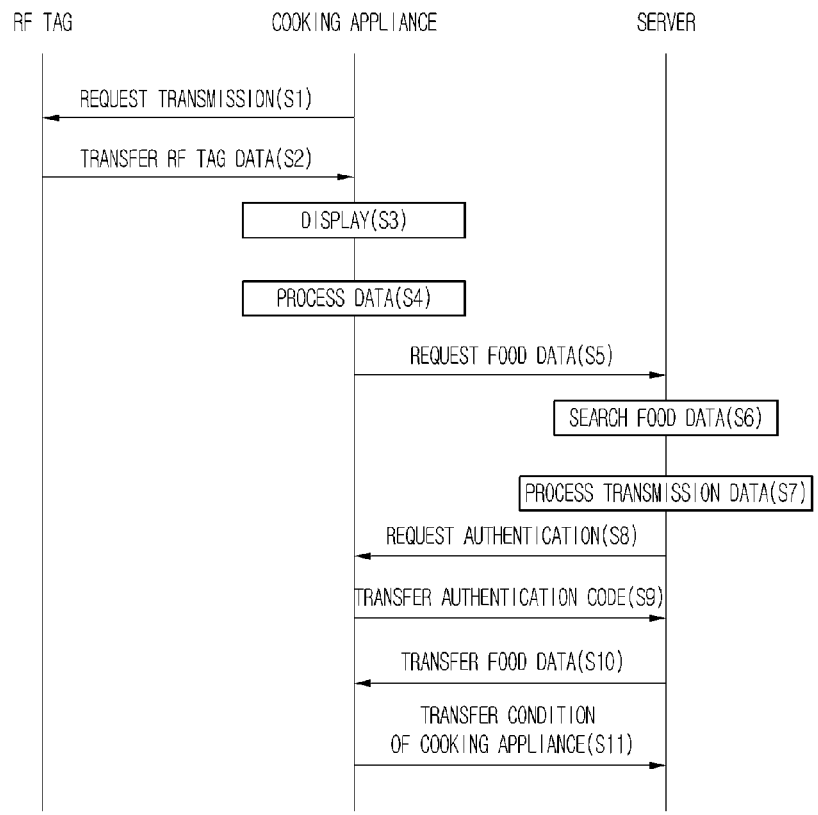
FIG. 8 is a flowchart of a cooking method according to the second embodiment.

FIG. 8 is a flowchart of a cooking method according to the second embodiment.

Referring to FIG. 8, a user brings a cooking appliance 101 close to a specific position of a cooking information book in order to obtain additional data on food. Then, in operation S1, the cooking appliance 101 requests an RF tag 102 to transmit data recorded in the first RF tag 102. Here, if the RF tag 102 manually operates, energy may be applied thereto.

In operation S2, the RF tag 102 transmits the data to the cooking appliance 101 in response to the transmission request. The RF tag 102 may transmit data only after authentication for the cooking appliance 101.

In operation S3, the cooking appliance 101 receives data from the RF tag 102 and displays the data of food. Here, the displayed data may include an ID of food such as [a vegetable pizza of pan size], address data on a network where a server 104 is located, or the like. A user processes the displayed data in operation S4 to request the server 104 for food data in operation S5. Here, the processing of the data may be predetermined between the cooking appliance 101 and the server 104 operated by a company that has fabricated a cooking information book. For example, it may be predetermined to layer data on food is filled in a specific transmission field and is transmitted to the server 104. In addition, although the user fails to recognize the data, the specification data of the cooking appliance 101 is received together.

The server 104 requested for transmission of food data searches for data of the corresponding food therein or collects data from an external system in operation S6 to process data to be directly transmitted in operation S7. Here, the processed data, as described above, may include data on other food related to the requested food, for example, a bulgogi pizza, if data on a vegetable pizza is transmitted, data on a cooking method of making a vegetable pizza using a specific oven, data on a moving picture about a detailed cooking process, preferences of other users about a vegetable pizzal cooked by a method introduced in a cook book, or the like.

The server 104, before providing food data to the cooking appliance 101, requests the cooking appliance 101 for authentication data for determining whether or not the terminal or the cooking information book is authenticated in operation S8. In operation S9, the terminal requested for the authentication data transmits an authentication code. The authentication code may include data received from the RF tag 102.

When the authentication code is received and it is confirmed that the terminal or the cooking information book is authenticated, the processed food data is transmitted from the server 104 to the cooking appliance 101 in operation S10.

Thereafter, operation data of the cooking appliance 101 may be stored in a memory unit 114 of the cooking appliance 101 to operate the cooking appliance 101. Additional data is display on a display unit or represented as sound, and a user can obtain additional data on food therethrough.

<Third Embodiment>

Comparing a third embodiment with the second embodiment, two embodiments are the same in that a cooking appliance is connected to a server through a network, except that the cooking appliance according to the third embodiment is first connected to an indoor server and then interacts with the other appliances.

Figure 9:
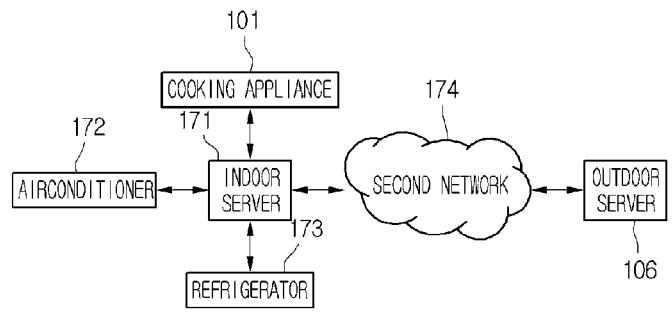
FIG. 9 is a block diagram of a cooking system according to a third embodiment.

FIG. 9 is a block diagram of a cooking system according to a third embodiment.

Referring to FIG. 9, a cooking system includes an indoor server 171 controlling various electronic appliances installed in a home, a cooking appliance connected to the indoor server 171, an airconditioner 172, and a refrigerator 173. That is, a plurality of appliances installed in the home primarily interact with the indoor server 171.

According to the cooking system, since data required from the cooking appliance 101 need not be transmitted to an outdoor via a second network 174, the data is processed using the indoor server 171. As a result, stability of a control system may be improved by reducing total control traffic. It is easily predictable that various data corresponding to a request of the cooking appliance 101 is previously stored in the indoor server 171. In case where the data stored in the indoor server 171 is lacked, it is easily predictable that the cooking appliance is connected to an outdoor server 106 to download necessary data.

Meanwhile, the above embodiments are not separated from each other. For example, control data of the cooking appliance may be directly stored in the cooking appliance according to the first embodiment. On the other hand, as described in the second and third embodiments, the control data of the cooking appliance may be transmitted from the server. The user can selects much better control data by comparing the two cases.

The second and third embodiments may further include the following modified examples.

In addition, the request of authentication from the server to the cooking appliance (S8) and the transmission of the authentication code (S9) should be performed between the request of food data from the cooking appliance to the server and the transmission (S10) of the food data from the server to the cooking appliance, and a specific order does not matter.

During cooking of a food, a display unit 12 built in the cooking appliance may display various data related to the food. Hence, it s not boring while the user is waiting for cooking the food. Also, it is more convenient because the cooking condition of the food is observed through a moving picture.

<Fourth Embodiment>

In the above-described embodiments, the data is received from the server, and then the user modifies the received data to operate the cooking appliance. However, in case where the operation data of the cooking appliance is received as one set, there is a limitation that the cooking appliance is not operated corresponding to the operation state of the cooking appliance. For example, in case where the cooking appliance is deteriorated, although the operation data of the cooking appliance is received as the one set to operate the cooking appliance, the cooking appliance is not heated at its corresponding temperature. This is done because the calorific value is not sufficient due to physical deterioration. The fourth embodiment allows such limitation to be dealt with efficiently.

In a cooking system of the present embodiment, a construction of a fifth embodiment is the same as that of the second embodiment. Portions without specific description will cite the description of the second embodiment, and detailed description thereof will be omitted.

In a cooking method of the fourth embodiment, in order that a food is cooked in an optimum condition, a server 106 may receive an operation state of an operation unit 115 and a detection state detected by a detecting unit 117 in real-time. Reflecting the operation state of the operation unit 115 and the detection state of the detecting unit 117, the server 106 may transmit optimum operation data of a cooking appliance in real-time. Therefore, the cooking appliance 101 can operate in an optimum operating state. For example, although the operation data is set such that the cooking appliance operates at about 300° C., but in reality, temperature of about 250° C. may be detected at the detecting unit 117 due to the deterioration of the cooking appliance. In a case, the server reflects the operation state and the detection state to modify the operation state of the operation unit 115 such that a heater operates at a high temperature.

Hereinafter, a cooking method according to the fourth embodiment will be described in detail with reference to a flowchart.

Figure 10:
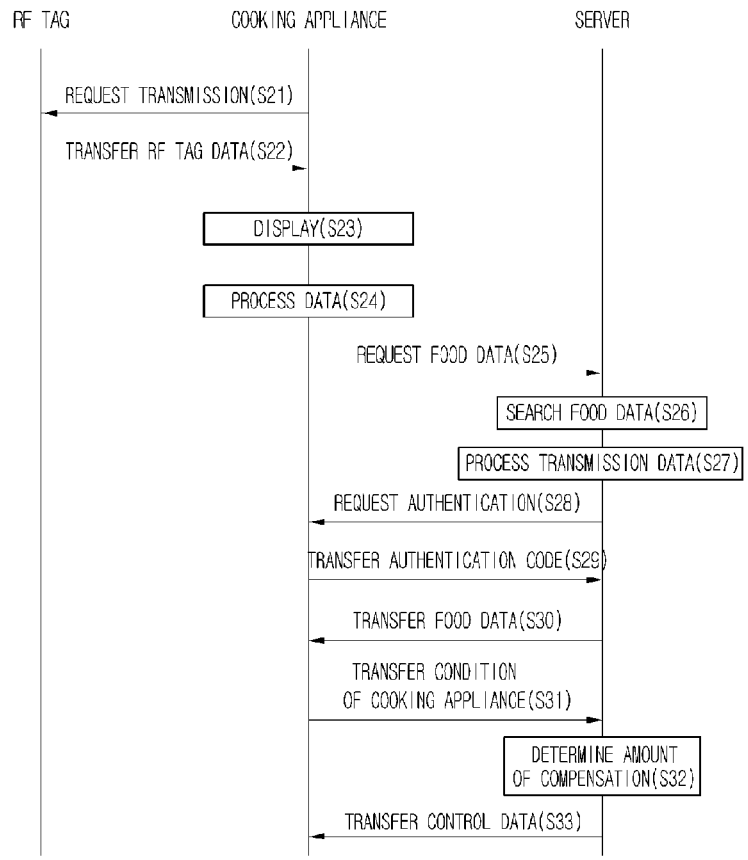
FIG. 10 is a flowchart of a cooking method according to the third embodiment.

FIG. 10 is a flowchart of a cooking method according to the third embodiment.

Referring to FIG. 10, a user brings a cooking appliance 101 close to a specific position of a cooking information book in order to obtain additional data on food. Then, in operation S21, the cooking appliance 101 requests an RF tag 102 to transmit data recorded in the first RF tag 102. Here, if the RF tag 102 manually operates, energy may be applied thereto.

In operation S22, the RF tag 102 transmits the data to the cooking appliance 101 in response to the transmission request. The RF tag 102 may transmit data only after authentication for the cooking appliance 101.

In operation S23, the cooking appliance 101 receives data from the RF tag 102 and displays the data of food. Here, the displayed data may include an ID of food such as [a vegetable pizza of pan size], address data on a network where a server 104 is located, or the like. A user processes the displayed data in operation S24 to request the server 104 for food data in operation S25. Here, the processing of the data may be predetermined between the cooking appliance 101 and the server 104 operated by a company that has fabricated a cooking information book. For example, it may be predetermined to layer data on food is filled in a specific transmission field and is transmitted to the server 104. In addition, although the user fails to recognize the data, the specification data of the cooking appliance 101 is received together.

The server 104 requested for transmission of food data searches for data of the corresponding food therein or collects data from an external system in operation S26 to process data to be directly transmitted in operation S27. Here, the processed data, as described above, may include data on other food related to the requested food, for example, a bulgogi pizza, if data on a vegetable pizza is transmitted, data on a cooking method of making a vegetable pizza using a specific oven, data on a moving picture about a detailed cooking process, preferences of other users about a vegetable pizzal cooked by a method introduced in a cook book, or the like.

The server 104, before providing food data to the cooking appliance 101, requests the cooking appliance 101 for authentication data for determining whether or not the terminal or the cooking information book is authenticated in operation S28. In operation S29, the terminal requested for the authentication data transmits an authentication code. The authentication code may include data received from the RF tag 102.

When the authentication code is received and it is confirmed that the terminal or the cooking information book is authenticated, the processed food data is transmitted from the server 104 to the cooking appliance 101 in operation S30.

Thereafter, operation data of the cooking appliance 101 may be stored in a memory unit 114 of the cooking appliance 101 to be used for an operation the cooking appliance 101. Additional data is display on a display unit or represented as sound, and a user can obtain additional data on food therethrough.

In operation S31, the cooking appliance 101 receives a detection state of the cooking appliance 101 detected by the detecting unit 117 in real-time. In operation S32, an amount of compensation that modifies the operation state of the cooking appliance is determined according to an offset between the current operation state of the operation unit 115 and the detection state of the detecting unit 117. In operation S33, referring to the amount of the compensation, control data directly controlling the cooking appliance 101 is generated to transmit the generated data to the cooking appliance 101. In case where the cooking appliance may do not operate as expected due to the deterioration of the cooking appliance 101, the control state of the cooking appliance 101 is modified in real-time to cook the food in the optimum operating state.

<Fifth Embodiment>

A construction of a fifth embodiment is the same as those of the embodiments. The fifth embodiment according to the present disclosure provides a cooking system capable of improving an abnormal operation of a cooking appliance due to deterioration of the cooking appliance as described in the fifth embodiment and a method for using the same.

Hereinafter, the fifth embodiment will be described in detail with reference to accompanying drawings. Although an oven is explained in the fifth embodiment, this disclosure is not limited thereto, and can be modified variously. For example, a cooking system including a memory unit and a control unit may be used in the fifth embodiment.

Figure 11:
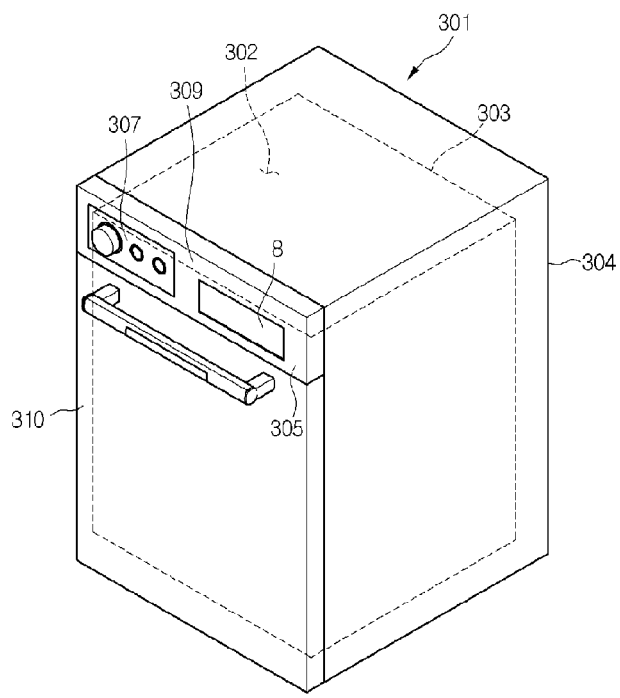
FIG. 11 is a perspective view of a cooking system according to a fifth embodiment.

FIG. 11 is a perspective view of a cooking system according to a fifth embodiment.

Referring to FIG. 11, an oven 301 includes an external case 304, an internal case 303, a door 310, and a control panel 305. The external case 304 defines an appearance of the oven 301. The internal case 303 is disposed inside the external case 304 and includes a cavity 302 receiving foods therein. The door 310 selectively opens and closes an opened front surface of the internal case 303. The control panel 305 disposed on an upper side of the door operates an operation of the oven 301 or displays an operation state of the oven 301. The control panel 305 includes a manipulation unit 307 controlling the operation of the oven 301 by a user and a display unit 308 displaying the operation state of the oven 301. A control board 309 is disposed in a rear direction of the control panel 305. The control board 309 includes a plurality of electronic components and substantially controls operation states of the manipulation unit 307 and the display unit 308.

A detailed description of a general operation of the oven 301 will be omitted because it is well understood by a related art oven. However, a detachable heater (refer to a reference numeral 306 of FIG. 12) is disposed in the cavity 302. An inner space of the cavity 302 is heated by the heater 306 to cook a food. A Construction and functions of the detachable heater will be understood with reference to FIGS. 12 and 13.

Figure 12:
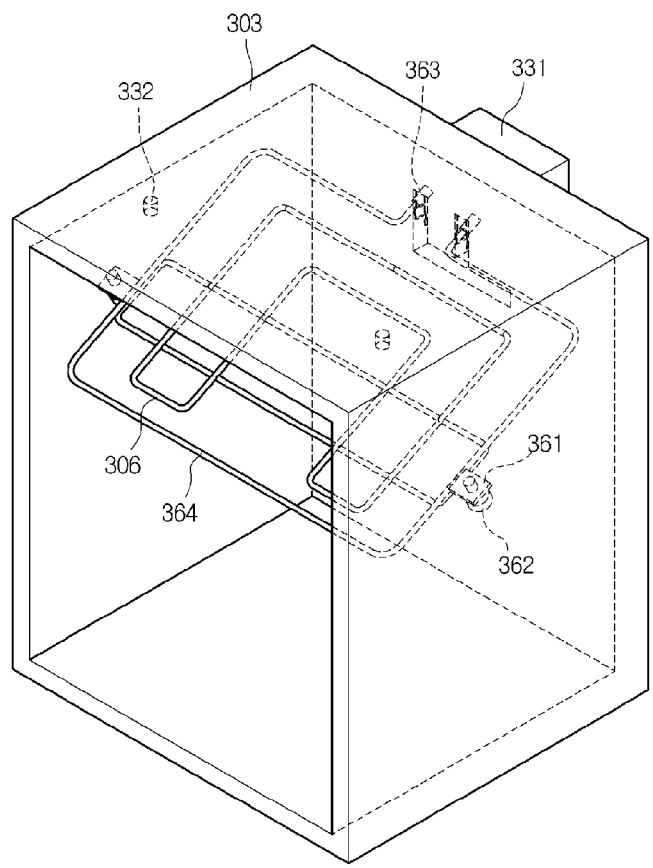
FIG. 12 is a perspective view of a cooking system where a heater is separated from a case.
Figure 13:
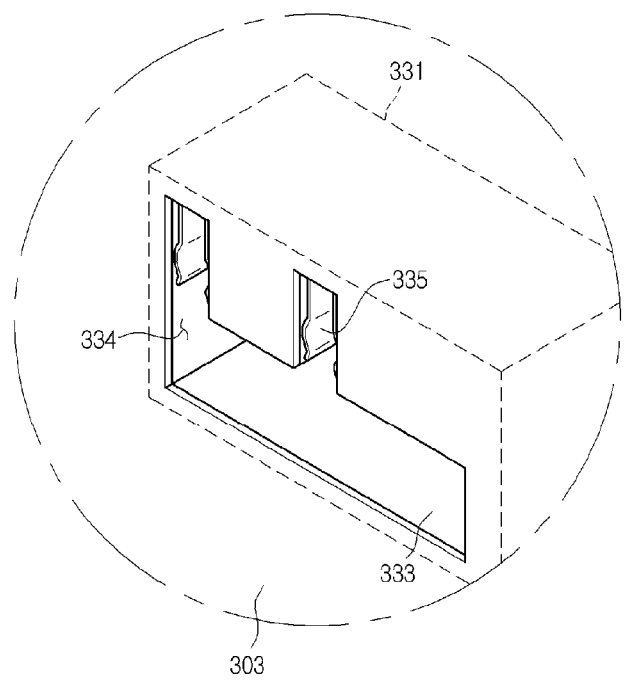
FIG. 13 is a partial perspective view of a junction box.

Referring to FIGS. 12 and 13, a heater is freely removed from or installed in a cavity in a state that the heater is disposed inside the cavity. FIG. 11 is a perspective view of the cooking system where the heat is removed from the cavity.

The heater 306 includes a bent wire 364, extended coupling portions 361, and heater connecting portions 363. The wire 364 generates heat by applying a power source. The extended coupling portions 361 are disposed on both sides of the wire 364. The heater connecting portions 363 are disposed on ends of the wire 364 in order to apply the power source to the wire 364. A heating element is disposed in the wire 364 to generate the heat using the external power source. The extended coupling portion irrelevant to the heating is coupled to the wire 364 to fix the heater 306.

A connection box 331 is disposed on an outer surface of a rear surface of the internal case 303 in order to receive the external power source in a state that the heater connecting portion 363 is fixed to the internal case 303. Within the connection box 331, the heater connecting portion is connected to receive the external power source. A body connecting portion 335 is disposed in order to support the heater connecting portion against an impact from the outside. The body connecting portion 335 includes two supporting plates with respect to one heater connecting portion 363. A guide groove 333 and an introducing groove 334 are formed in a wall of the internal case 303.

Referring to this construction, installation and removal of the heater will be described below.

When a user installs the heater 306 in the internal case 303, the heater connecting portion 363 is inserted into the guide groove 333. The heater 306 is inserted in a formation direction, i.e., left direction viewing the drawing, of the guide groove 333 and then is pushed up along the introducing groove 334 when the heater connecting portion 363 and the body connecting portion 335 are aligned. Since a diameter of the heater connecting portion 363 is a greater than that of the wire 364, the heater 306 is not separated from the internal case 303 when the heater 306 is guided into the introducing groove 334.

When heater connecting portion 363 and the body connecting portion 335 are connected to apply the external power source to the heater 306, the extended coupling portion 361 and the heater coupling portion 332 are aligned. A coupling member 362 such as a screw is inserted into the extended coupling portions 361 and the heater coupling portion 332 to firmly fix the heater 306 to the internal case 303.

On the other hand, when the heater 306 is removed from the internal case 303, an operation contrary to the inserting operation of the heater 306 is performed.

As described above, when a new heater is installed, a cooking method adapted for an specification data of the newly installed heater must be set to the oven.

Hence, when the new heater is installed, an IC chip (refer to a reference numeral 392 of FIG. 14) including a data storage unit must be replaced together. Of course, when the heater is sold, the IC chip may be sold together. For example, when the existing heater 306 having 1000 W power was replaced with a heater having 2000 W power, in case where the replaced heater operates at about 10 minute, the heater is overheated. As a result, a food is burned and an overload is generated in the cooking system to damage the cooking system. Hence, when a component such as the heater, which has a direct effect on an operation of the cooking appliance, is replaced, control data of an operation of the component must be modified together. To do this, the IC chip 392 storing new control data is provided together.

Figure 14:
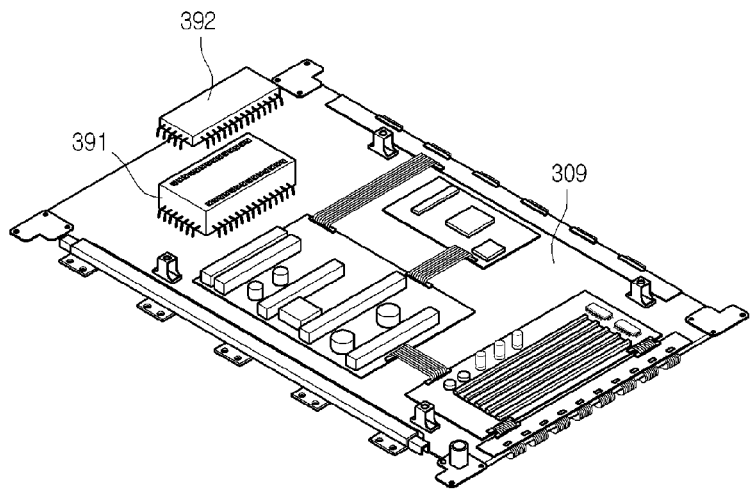
FIG. 14 is a perspective view of a control board.

FIG. 14 is a perspective view of a control board 309.

Referring to FIG. 14, a plurality of electronic components and a socket 391 are disposed on the control board 309. The IC chip 392 is mounted on the socket 391. The IC chip 392 may be provided in various forms, which are convenient for removing and mounting the IC chip 392 from the socket 391, and configuration of the socket is not limited to those in the embodiments described above. That is, the IC chip 392 storing the operation data of the cooking system according to the fifth embodiment may include various forms only except that the IC chip 392 is fixed to the control board in an unmovable manner such as solder.

In case where the IC chip 392 is a microprocessor, which performs a main operation with respect to the control operation of the cooking system, the microprocessor can store the operation data of the heater 306 as well as various data for controlling overall operations of the cooking system. For example, the microprocessor can further include a modification of a display state of a display unit 308 or a cooking method related to a new food unincluded in a guide menu of the existing cooking system.

The fifth embodiment may further include a following modified example.

In the fifth embodiment, when a heating source of the cooking system such as the heater is replaced, the IC chip is additionally modified. However, only the IC chip may be modified without replacing the heating source such as the heater. For such a reason, only an operation manner of an additional component such as the heater may be modified in the same construction as physical components such as the heater. For example, designs or characters displayed on the display unit may be modified for expressing that the same function is performed, the guide menu of the cooking method related to the new food unincluded in the existing cooking system may be modified.

Although the control board 9 is disposed on the rear surface of the control panel 5 in this embodiment, the present disclosure is not limited thereto, and the control board 9 may be disposed over a cavity, i.e., at a position where electronic components are disposed. In addition, in case where a component is easily detachable by a user, a predetermined cover may be further included on an outer surface of the control panel in order to easily separate the IC chip.

Also, although the microprocessor of the cooking system is entirely replaced in this embodiment when the heater is replaced, the present disclosure is not limited thereto. Hence, the control data of the heater and the operation data of the heater may be individually stored in an additional IC chip. In such cooking system, a corresponding specification data of the heater is stored in a corresponding IC chip to transmit the data to the microprocessor controlling the cooking system. In a case, costs for replacing the heater are reduced because only a corresponding memory is replaced without completely replacing the expensive microprocessor.

<Sixth Embodiment>

A construction and an operation of a sixth embodiment is the same as those of the fifth embodiment, except that data, which must be provided together when the heater 306 is replaced, for controlling the heater 306 is transmitted through a network. Hence, Portions without specific description will cite the description of the fifth embodiment, and detailed description thereof will be omitted.

Figure 15:
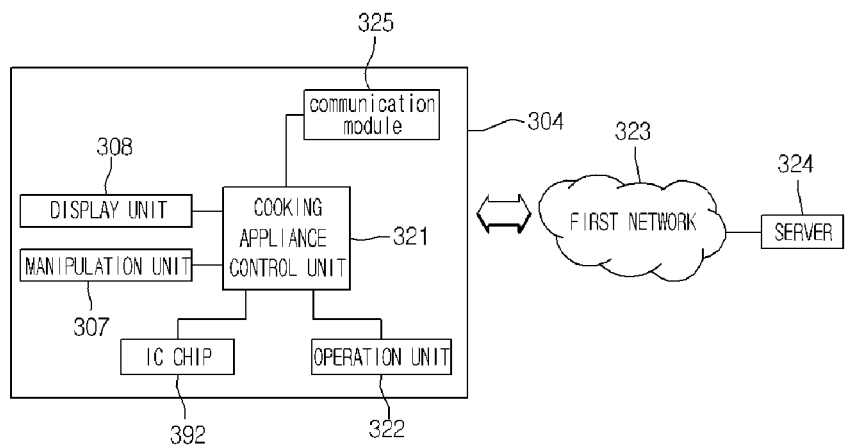
FIG. 15 is a block diagram of a cooking system according to a sixth embodiment.

FIG. 15 is a block diagram of a cooking system according to a sixth embodiment.

Referring to FIG. 15, the oven 301 includes a cooking appliance control unit 321, a display unit 321, a manipulation unit 307, an IC chip 392, and an operation unit 322. The cooking appliance control unit 321 controls an entire system of the oven 301. The display unit 321 displays various data such as a state data of the cooking appliance control unit 321. The manipulation unit 307 is used for manipulating the oven by a user. The IC chip stores various data necessary for operating the oven. The operation unit includes each of components for operating the oven. A communication module 325 communicating with the other appliances is further included in the oven 301. The communication module 325 is connected to a server 324 disposed outside the communication module 325 through a network 323 to transmit/receive the various data necessary for operating the oven.

The IC chip stores the data necessary for operating the oven. Although the IC chip is separated from the cooking appliance control unit 321 in this embodiment, the IC chip may be built in the cooking appliance control unit 321.

A method of using the cooking system will be described in detail with reference to a flowchart of FIG. 16.

Figure 16:
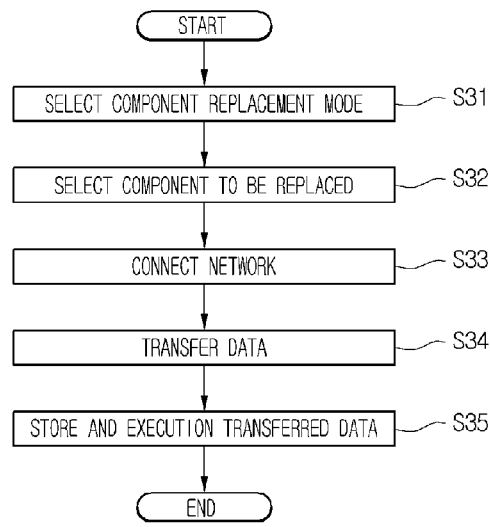
FIG. 16 is a flowchart illustrating a method of using the cooking system according to the sixth embodiment.

Referring to FIG. 16, in the method of using the cooking system, a user replaces the heater and then manipulates an oven to select a component replacement mode in operation S31. In operation S32, if the user selects the component replacement mode, the cooking appliance control unit 321 requests that any component is replaced from the user and catches data of a corresponding component to be replaced from the user. In operation S33, the data of the corresponding component to be replaced is transmitted to the server. In operation S34, the server receiving the accurate data of the component to be replaced obtains specification data and additional data of the component and then transmits the data to the oven.

The data received to the oven includes a concrete option as well as various data such as an operation data capable of operating the oven using the replacement component, a method of using the replacement component, and a control program of the replacement component.

Thereafter, in operation S35, the data received from the server is stored in the IC chip 392 of the oven and used as a new control method for controlling the oven.

In another case of this embodiment, a heating element of the cooking appliance is replaced, and then data controlling the heating element may be transmitted to the cooking appliance via the server or by replacing the IC chip. On the other hand, the data may be transmitted by connecting a storage media such as USB memory.

In addition to the above embodiments, various embodiments can be provided within the scope of the disclosure. More particularly, component parts included in any one embodiment may combine with component parts included in the other embodiment to present a new embodiment. In addition to variations and modifications in the component parts and/or arrangements, alternative uses will also be apparent to those skilled in the art.

Industrial Applicability

According to the present disclosure, much more data can be obtained through a cooking information book and effectively utilize a cooking method using a cooking appliance even if the user is ignorant of data provided by the cooking information book. A person who is ignorant of catering for materials of a food easily caters materials of the food using an image data before cooking the food. A user can obtain the latest data related to the food in real-time, and much more data can be provided by varying usefulness of the cooking information book to improve satisfaction of a book purchaser. The optimum data can be transmitted to cook the food in a state required by the user, and the cooking appliance can operate in an optimum condition even if the cooking appliance is deteriorated. The user can accurately cook the food into user's desired directions. Components of the cooking system can be easily replaced according to the user's preference, and data of a new cooking system can be always obtained to improve convenience of the user.

The invention claimed is:

1. A cooking system comprising:
an identification tag;
a cooking appliance provided with a reader to receive food related data from the identification tag, the cooking appliance comprising at least a heating element, the food related data including layer data of food, address data on a network where the server is located and an ID of food; and
a server receiving at least the food related data and specification data of the cooking appliance from the cooking appliance, the server transmitting food cooking data for cooking a food suitable for the cooking appliance using the food related data,
wherein the server, before transmitting the food cooking data, requests authentication data from the cooking appliance, and the cooking appliance transmits an authentication code received from the identification tag,
wherein the cooking appliance operates by using the food cooking data for cooking a food,
wherein the layer data relates to characteristics of the food and each characteristic is assigned an identifier, and
wherein the identifier is a number.

2. The cooking system according to claim 1, wherein the food cooking data is modified by a user.

3. The cooking system according to claim. 1. wherein the identification tag is built in a cookbook.

4. The cooking system according to claim 3, wherein the cookbook comprises:
a first sheet media;
a food design portion on a surface of the first sheet media;
a radio frequency tag as the identification tag on a lower surface of a position corresponding to the food design portion; and
a conductor facing a bottom surface of the radio frequency tag, the conductor shielding high frequency from the radio frequency tag.

5. The cooking system according to claim 3, wherein the cookbook is sheet media with a plurality of papers, the cookbook comprising:

a food design portion on a surface of the sheet media, the food design portion including a food related design; and
the identification tag on the sheet media of a position corresponding to the food design portion, the identification tag recording food data related to the food design of the food design portion.

6. The cooking system according to claim 1, wherein the food cooking data comprises an image data to display a cooking process of the food on the cooking appliance.

7. The cooking system according to claim 1, wherein the food cooking data is transmitted from the cooking appliance to the server in real-time.

8. The cooking system according to claim 1, wherein the cooking appliance further comprises a detecting unit detecting an operation state of the cooking appliance,
wherein the detected data detected by the detecting unit is transmitted to the server, and the server transmits an optimum food cooking data with reference to the detected data in real-time.

9. The cooking system according to claim 1, wherein the identification tag is a radio frequency tag.

10. A cooking method comprising:
inputting cooking data of a food to a cooking appliance;
transmitting the cooking data of the food to a server;
requesting authentication data from the server to the cooking appliance;
transmitting an authentication code received from an identification tag of the cooking appliance to the server;
receiving food related data from the identification tag, the food related data including layer data of food;
generating cooking control data with reference to the cooking data of the food by the server; and
operating the cooking appliance using the cooking control data under a control of the server to perform cooking of the food,
wherein the layer data relates to characteristics of the food and each characteristic is assigned an identifier, and
wherein the identifier is a number.

11. The cooking method according to claim 10, wherein the cooking control data is modified according to an operation state of the cooking appliance.

12. The cooking method according to claim 10, wherein the characteristics comprise a region of the food and a type of the food.

13. The cooking method according to claim 10, wherein the identification tag is a radio frequency tag.

14. A cooking system comprising:
an identification tag;
a cooking appliance provided with a reader to receive food related data from the identification tag, the cooking appliance comprising at least a heating element, the food related data including layer data of food, address data on a network where the server is located and an ID of food; and
a server receiving at least the food related data and specification data of the cooking appliance from the cooking appliance, the server transmitting food cooking data for cooking a food suitable for the cooking appliance using the food related data,
wherein the server, before transmitting the food cooking data, requests authentication data from the cooking appliance, and the cooking appliance transmits an authentication code received from the identification tag,
wherein the cooking appliance operates by using the food cooking data for cooking a food,
wherein the layer data relates to characteristics of the food and each characteristic is assigned an identifier, and wherein the characteristics comprise a region of the food and a type of the food.

* * * * *